July 19, 1938. J. L. WOODBRIDGE 2,124,174
STORAGE BATTERY CHARGE INDICATING MEANS
Filed Nov. 28, 1936

WITNESS:

INVENTOR
Joseph Lester Woodbridge
BY
Augustus B. Stoughton
ATTORNEY.

Patented July 19, 1938

2,124,174

UNITED STATES PATENT OFFICE 2,124,174

STORAGE BATTERY CHARGE INDICATING MEANS

Joseph Lester Woodbridge, Philadelphia, Pa., assignor to The Electric Storage Battery Company, Philadelphia, Pa., a corporation of New Jersey Application November 28, 1936, Serial No. 113,161

4 Claims. (Cl. 265—45)

One object of my invention is to provide an improved support for specific gravity indicating means and, more specifically, for such means when employed in storage battery cells to indicate the state of charge of the battery by indicating the specific gravity of the electrolyte.

My improved support consists essentially of a U-shaped rod, preferably of resilient material, and adapted to receive specific gravity indicating means such as bodies having a specific gravity intermediate the maximum and minimum specific gravity of the electrolyte. The vertically extending arms of the support may be sprung towards each other to pass through the open top of the container of the storage battery, which top may have a restricted throat. The resiliency of the support then causes the vertically extending arms to be pressed against the walls of the container, preferably at the diagonally opposite corners, and thus retain the support and the specific gravity indicating means mounted thereon in a convenient location in the cell for observation of the specific gravity indicating means.

For a further exposition of my invention, reference may be had to the annexed drawing and specification, at the end thereof my invention will be specifically pointed out and claimed.

Figure 1:
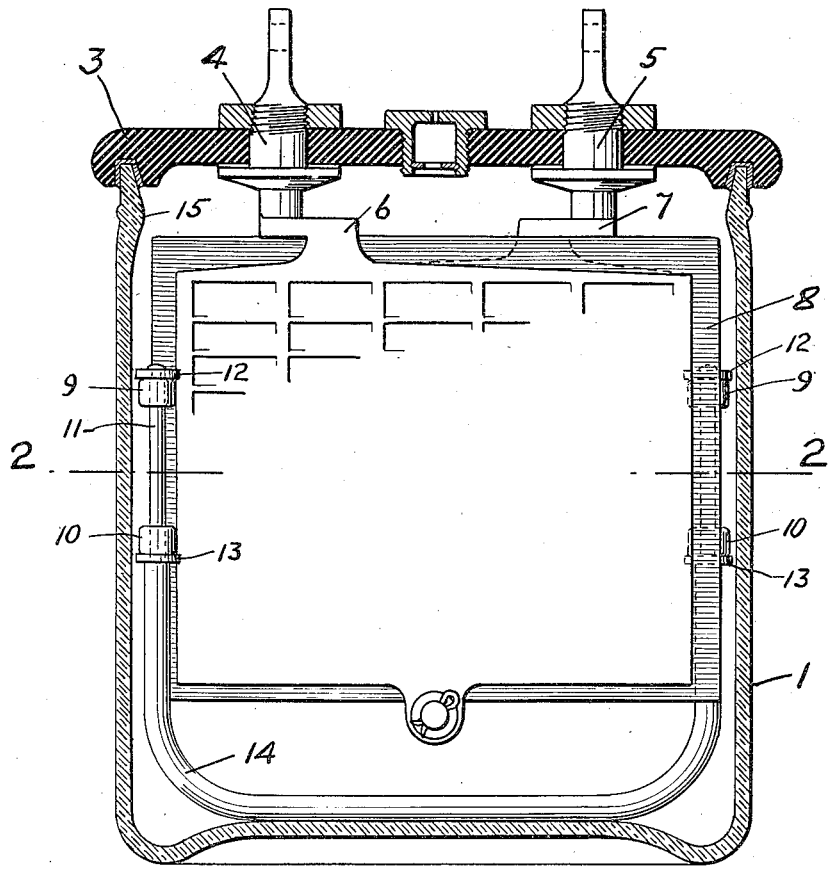
Fig. 1 is an elevation, partly in section, showing a storage battery cell in which the charge indicating device is incorporated.
Figure 2:
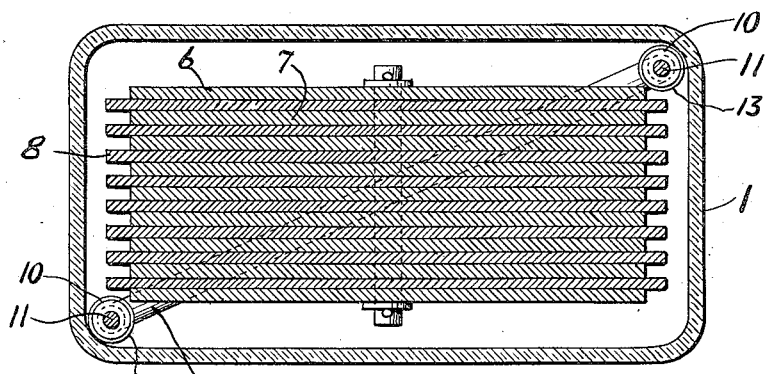
Fig. 2 is a horizontal section on the line 2—2 of Fig. 1.

In Fig. 1, 1 is the container of a storage battery cell of glass or similar transparent material. The cell is provided with a cover 3 from which are suspended by the terminal posts 4 and 5 the negative and positive plate groups 6 and 7, the plates being spaced by separators 8. The charge indicating means consist of one or more bodies 9 and 10 of a specific gravity intermediate between the maximum and minimum specific gravity of the electrolyte, these bodies as here shown being approximately cylindrical in shape, perforated axially and supported on a vertical rod 11 passing through the perforations. The bodies 9 and 10 are loosely supported on the rod 11, being free to travel along the rod in accordance with changes in the specific gravity of the surrounding electrolyte, and their travel is restricted by the washers 12 and 13 attached to the rod 11 above and below, respectively, the limits of travel of the bodies 9 and 10. The rod 11 and the bodies 9 and 10 are located in a corner of the jar 1, between the outside negative plate and the jar wall as shown in Fig. 2.

Below the washer 13, the rod 11 is of greater diameter providing a shoulder for supporting the washer 13 and this enlarged portion extends downwardly to the bottom of the jar where it curves into a horizontal member 14 which extends diagonally across the bottom of the jar and up along the diagonally opposite corner, terminating in another vertical portion similar to the rod 11 which loosely supports two other perforated bodies similar to 9 and 10 between washers similar to 12 and 13.

The diameter of the washers 12 and 13 is somewhat greater than that of the bodies 9 and 10 so that the latter are prevented from coming in contact with the jar wall or the outside negative plate.

When the specific gravity of the electrolyte is at its maximum value corresponding to the fully-charged condition of the cell, both of the bodies 9 and 10 will be at the upper end of their travel. When the specific gravity of the electrolyte is at its minimum value corresponding to the discharged condition of the cell, both of the bodies 9 and 10 will be at the lower extreme of their travel. When the specific gravity of the electrolyte is between that of the bodies 9 and 10, these bodies will occupy the position shown in Fig. 1.

The construction herein shown and described has certain advantages over devices previously used for this purpose as follows:

The assembly of the bodies 9 and 10 and the similar bodies at the opposite end of the rod may be made independently of the jar and of the plate groups supported in the jar and may be installed in the jar before the plate groups are inserted. It will be noted that the internal neck of the jar is smaller at the top as shown at the points 15 than the internal dimensions below this point which is a feature commonly found in jars of this character having a molded top but otherwise formed by being blown into a mold below. The supporting bar 11—14 may be made of resilient metal such as lead-antimony alloy and the ends may be sprung together for insertion through the narrower neck of the jar and thereafter they will spring outwardly, bringing the washers 12 and 13 against the inner vertical wall of the jar at the diagonally opposite corners or in any other convenient position with some degree of pressure, thus holding the structure in place while the cover with its suspended plate groups is placed in position.

This construction also provides charge indicating bodies in the two diagonally opposite corners of the cell where they can be seen from either of the four sides of the jar in whatever position the cell may be located in the battery.

I do not intend to be limited save as the scope of the prior art and of the attached claims may require.

I claim:—

1. Means for indicating changes in the specific gravity of a liquid in a rectangular container having transparent walls, said means comprising a plurality of perforated bodies immersed in said liquid and of specific gravity intermediate the maximum and minimum specific gravity of the liquid, said bodies being located at opposite ends of a U-shaped supporting bar whose upturned ends pass loosely through the perforations in said bodies, said ends being located in diagonally opposite vertical angles of the container walls, the horizontal portion of the U-bar lying diagonally across the bottom of the container.

2. A structure in accordance with claim 1 in which the supporting bar is of resilient material and its upturned ends are sprung together from their normally free position to conform to the internal diagonal of the container.

3. In combination in a charge indicating device for a storage battery cell having transparent walls and containing electrolyte whose specific gravity varies, a specific gravity indicator immersed in the electrolyte, and a support for said indicator comprising a U-shaped member of resilient material sprung into position with its horizontal part lying across the bottom of the cell and its upright ends stressed against opposite points of said walls.

4. In combination in a charge indicating device for a storage battery cell having transparent walls and containing electrolyte whose specific gravity varies, a specific gravity indicator immersed in the electrolyte, and a support for said indicator comprising a U-shaped member located with its horizontal part lying across the bottom of the cell and its upright ends held in position by the configuration of said walls.

JOSEPH LESTER WOODBRIDGE.